United States Patent
Parthasarathy

(10) Patent No.: US 7,185,181 B2
(45) Date of Patent: Feb. 27, 2007

(54) APPARATUS AND METHOD FOR MAINTAINING A FLOATING POINT DATA SEGMENT SELECTOR

(75) Inventor: Rajesh S. Parthasarathy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 691 days.

(21) Appl. No.: 10/212,911

(22) Filed: Aug. 5, 2002

(65) Prior Publication Data
US 2004/0024993 A1 Feb. 5, 2004

(51) Int. Cl.
*G06F 9/38* (2006.01)
*G06F 9/445* (2006.01)

(52) U.S. Cl. ..................................... 712/218
(58) Field of Classification Search ............... 712/218, 712/244; 714/10
See application file for complete search history.

(56) References Cited

U.S. PATENT DOCUMENTS

| 5,721,857 | A | * | 2/1998 | Glew et al. | .................. 712/23 |
| 5,884,062 | A | * | 3/1999 | Wichman et al. | ........... 712/218 |
| 6,049,868 | A | * | 4/2000 | Panwar | ....................... 712/244 |
| 6,282,636 | B1 | * | 8/2001 | Yeh et al. | .................... 712/218 |
| 6,442,707 | B1 | * | 8/2002 | McGrath et al. | .............. 714/10 |
| 6,934,832 | B1 | * | 8/2005 | Van Dyke et al. | .......... 712/244 |

* cited by examiner

*Primary Examiner*—Eric Coleman
(74) *Attorney, Agent, or Firm*—Blakely, Sokoloff, Taylor & Zafman LLP

(57) ABSTRACT

An apparatus and method for maintaining a floating point data segment selector are described. In one embodiment, the method includes the detection of a micro-operation of a memory referencing macro-instruction from one or more micro-operations to be retired during a system clock cycle. When the detected micro-operation triggers an event, a micro-code event handler is triggered to initiate an update of a floating point data segment selector information associated with the detected micro-operation. Otherwise, FDS update device is triggered to update the floating point data segment selector information associated with the detected micro-operation.

25 Claims, 10 Drawing Sheets

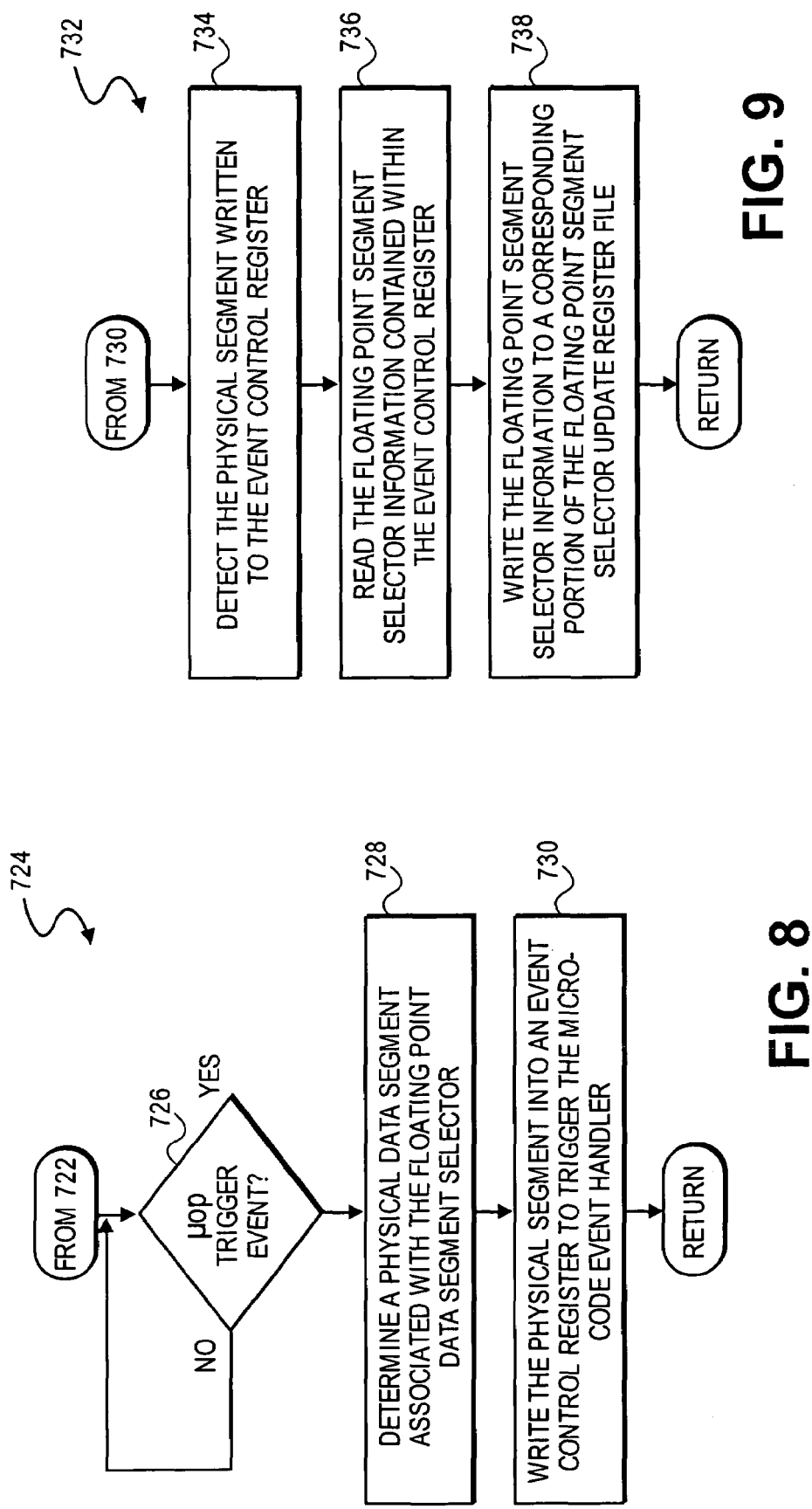

APPARATUS AND METHOD FOR MAINTAINING A FLOATING POINT DATA SEGMENT SELECTOR

FIELD OF THE INVENTION

One or more embodiments of the invention relate generally to the field of floating-point data. More particularly, one embodiment of the invention relates to a method and apparatus for maintaining a floating point data segment selector.

BACKGROUND OF THE INVENTION

Media applications have been driving microprocessor development for more than one decade. In fact, most computing upgrades in recent years have been driven by the Internet or media applications predominantly within consumer segments, but also in enterprise segments for entertainment, speech recognition, as well as multitasking environments. Nevertheless, future media applications will demand even higher computational requirements from future microprocessors. As a result, tomorrow's personal computer (PC) will be richer in audio/visual effects as well as improved usability, while enabling computing to merge with communications.

Accordingly, Internet audio and video streaming, as well as image processing and video content creation are continuously driving system architects to design even faster microprocessors. In order to improve microprocessor performance, several techniques have been utilized to improve the efficiency of modern day processors. One such technique for providing more efficient microprocessors is utilizing "Dynamic Execution". In summary, Dynamic Execution functions by determining the most efficient manner for executing program instructions, irrespective of the order in which the program instructions are received.

Dynamic Execution utilizes front end logic that fetches the next instructions within a program and prepares the instructions for subsequent execution in the machine pipeline. This front end logic utilizes highly accurate branch prediction logic that uses the past history of program execution to speculate where the program is going to execute next. The predicted instruction address from this front end branch prediction logic is used to fetch instruction bytes from a level two (L2) cache. Once fetched, these instruction bytes are decoded into basic operations called uOPs (micro-operations) that the execution core can execute.

As such, these micro-operations are provided to a Dynamic Execution unit, along with a sequence number assigned to each micro-operation. The Dynamic Execution logic has several buffers that it uses to sort and reorder the flow of instructions to optimize performance as instructions go down the pipeline and get scheduled for execution. This Dynamic Execution allows program instructions to proceed around the delayed instructions as long as they do not depend on those delayed instructions. As a result, micro-operation do not stall when following delayed instructions, in which case, efficiency dictates that the instructions execute in an out-of-order fashion.

The Dynamic Execution logic generally includes retirement logic that reorders the instructions executed in an out-of-order fashion (dynamic manner) back into the original program order. As a result, out-of-order execution generates a pool of active micro-operations that can be executed in a manner which is more efficient than conventional systems. However, in order to implement out-of-order execution, register renaming logic is required to rename logical registers in order to utilize 144-entry physical register files. In addition, the renaming logic is required for execution of legacy instructions with improved efficiency.

Unfortunately, segment registers associated with floating point instructions are generally renamed once provided to a renaming unit. Consequently, when a memory accessing floating point micro-instruction is generated, a source segment of the micro-operation is renamed. However, under certain conditions, software access to the renamed source segment information is vital in order to resolve events which may be triggered by the floating point micro-instruction. Unfortunately, current mechanisms for saving the original source of the memory referencing micro-instruction are unduly complicated. Therefore, there remains a need to overcome one or more of the limitations in the above-described, existing art.

BRIEF DESCRIPTION OF THE DRAWINGS

The various embodiments of the present invention are illustrated by way of example, and not by way of limitation, in the figures of the accompanying drawings and in which:

FIG. 8 depicts a flowchart illustrating an additional method for triggering a micro-code event handler in accordance with the further embodiment of the present invention.

FIG. 9 depicts a flowchart illustrating an additional method for triggering a micro-code event handler in accordance with a further embodiment of the present invention.

DETAILED DESCRIPTION

Figure 1:
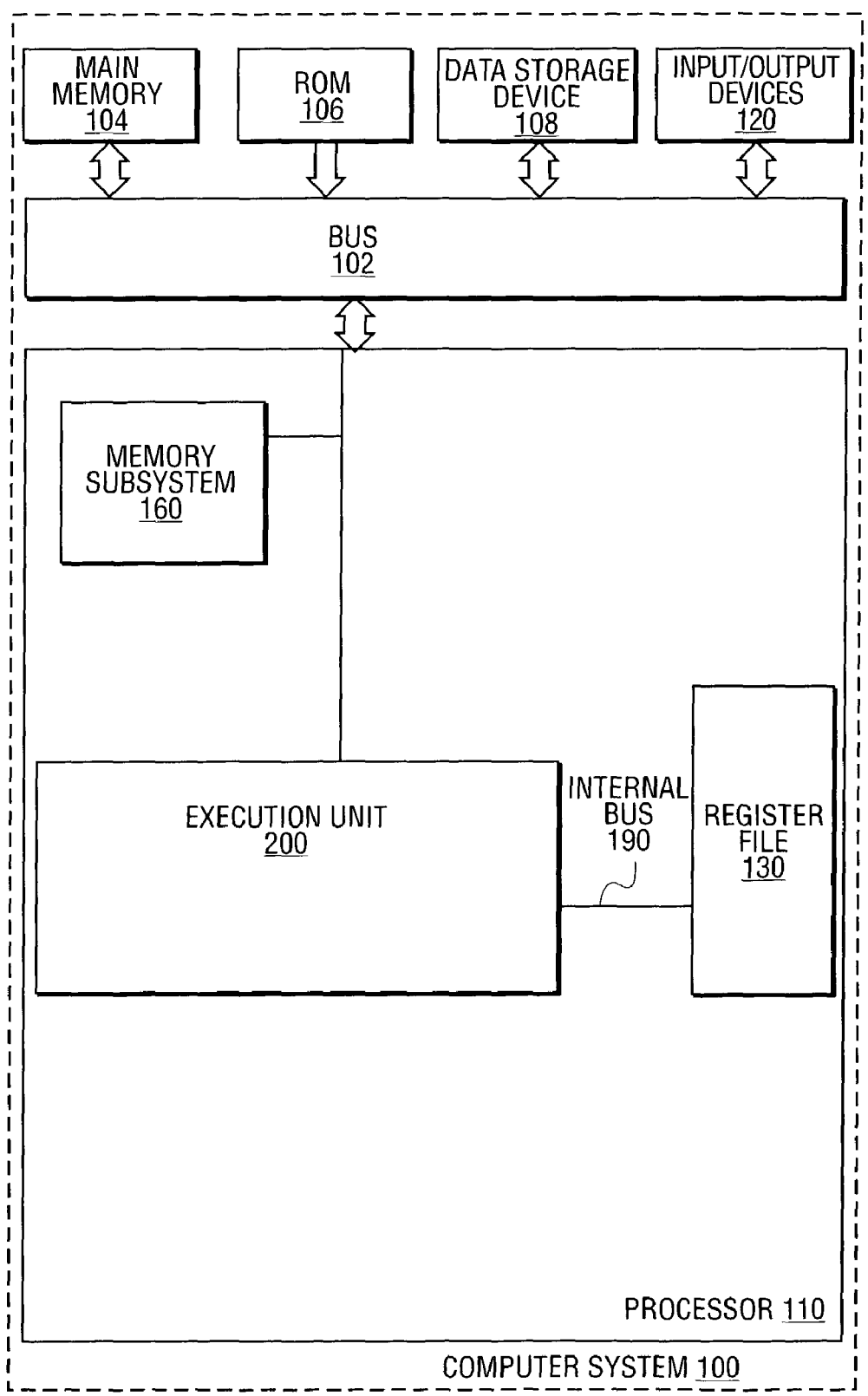
FIG. 1 depicts a block diagram illustrating a computer system utilizing a new protocol for maintaining a floating point data segment in accordance with one embodiment of the present invention.

A method and apparatus for maintaining a floating point data segment selector are described. In one embodiment, the method includes the detection of a memory referencing micro-operation from one or more micro-operations to be retired during a system clock cycle. When the detected micro-operation triggers an event, a micro-code event handler is triggered to initiate an update of a floating point data segment selector associated with the detected micro-operation. Otherwise, a device is triggered to update the floating point data segment selector associated with the detected micro-operation.

In the following description, for the purposes of explanation, numerous specific details are set forth in order to provide a thorough understanding of the embodiments of the present invention. It will be apparent, however, to one skilled in the art that the embodiments of the present invention may be practiced without some of these specific details. In addition, the following description provides examples, and the accompanying drawings show various examples for the purposes of illustration. However, these examples should not be construed in a limiting sense as they are merely intended to provide examples of the embodiments of the present invention rather than to provide an exhaustive list of all possible implementations of the embodiments of the present invention. In other instances, well-known structures and devices are shown in block diagram form in order to avoid obscuring the details of the embodiments of the present invention.

Portions of the following detailed description may be presented in terms of algorithms and symbolic representations of operations on data bits. These algorithmic descriptions and representations are used by those skilled in the data processing arts to convey the substance of their work to others skilled in the art. An algorithm, as described herein, refers to a self-consistent sequence of acts leading to a desired result. The acts are those requiring physical manipulations of physical quantities. These quantities may take the form of electrical or magnetic signals capable of being stored, transferred, combined, compared, and otherwise manipulated. Moreover, principally for reasons of common usage, these signals are referred to as bits, values, elements, symbols, characters, terms, numbers, or the like.

However, these and similar terms are to be associated with the appropriate physical quantities and are merely convenient labels applied to these quantities. Unless specifically stated otherwise, it is appreciated that discussions utilizing terms such as "processing" or "computing" or "calculating" or "determining" or displaying" or the like, refer to the action and processes of a computer system, or similar electronic computing device, that manipulates and transforms data represented as physical (electronic) quantities within the computer system's devices into other data similarly represented as physical quantities within the computer system devices such as memories, registers or other such information storage, transmission, display devices, or the like.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the embodiments of the present invention can be implemented in hard-wired circuitry, by programming a general-purpose processor, or by any combination of hardware and software.

One of skill in the art will immediately appreciate that the invention can be practiced with computer system configurations other than those described below, including handheld devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. The required structure for a variety of these systems will appear from the description below.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the embodiments of the present invention may be practiced as well as implemented as an embodiment).

In an embodiment, the methods of the present invention are embodied in machine-executable instructions, such as micro-code. The instructions can be used to cause a general-purpose or special-purpose processor that is programmed with the instructions to perform the methods of the embodiments of the present invention. Alternatively, the methods of various embodiments of the present invention might be performed by specific hardware components that contain hardwired logic for performing the methods, or by any combination of programmed computer components and custom hardware components to enable circuit design automation, software implementation hardware tasks or the like.

In one embodiment, the present invention may be provided as a computer program product which may include a machine or computer-readable medium having stored thereon instructions which may be used to program a computer (or other electronic devices) to perform a process according to the embodiments of the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

System Architecture

FIG. 1 shows a computer system 100 upon which one embodiment of the present invention can be implemented. Computer system 100 comprises a bus 102 for communicating information, and processor 110 coupled to bus 102 for processing information. The computer system 100 also includes a system memory subsystem 104–108 coupled to bus 102 for storing information and instructions for processor 110. Processor 110 includes an execution unit 200, a register file 130 and a processor memory subsystem 160.

The memory subsystem may include high speed, temporary memory buffers (cache) that are coupled to execution unit 200 and store frequently and/or recently used information for processor 110. As described herein, memory buffers, include but are not limited to cache memories, solid state memories, RAM, synchronous RAM (SRAM), synchronous data RAM (SDRAM) or any device capable of supporting high speed buffering of data. Accordingly, high speed, temporary memory buffers are referred to interchangeably as cache memories or one or more memory buffers.

In one embodiment of the invention, register file 200 includes multimedia registers, for example, SIMD (single instruction, multiple data) registers for storing multimedia information. In one embodiment, multimedia registers each store up to one hundred twenty-eight bits of packed data. Multimedia registers may be dedicated multimedia registers or registers which are used for storing multimedia information and other information. In one embodiment, multimedia registers store multimedia data when performing multimedia operations and store floating point data when performing floating point operations.

In one embodiment, execution unit 200 operates on image/video data according to the instructions received by processor 110. Execution unit 130 also operates on packed, floating-point and scalar data according to instructions implemented in general-purpose processors. Processor 110 is capable of supporting the Pentium® microprocessor instruction set as well as packed instructions referred to as SIMD streaming extensions (SSE) and SIMD streaming extensions two (SSE2) instructions, which operate on packed data. By including a packed instruction set in a standard microprocessor instruction set, such as the Pentium® microprocessor instruction set, packed data instructions can be easily incorporated into existing software (previously written for the standard microprocessor instruction set). Other standard instruction sets, such as the PowerPC™ and the Alpha™ processor instruction sets may also be used in accordance with the described invention. (Pentium® is a registered trademark of Intel Corporation. PowerPC™ is a trademark of IBM, APPLE COMPUTER and MOTOROLA. Alpha™ is a trademark of Digital Equipment Corporation.)

In one embodiment, computer system 100 operates according to a segmentation memory model. As known to those skilled in the art, the segmentation memory model utilizes a memory organization methodology wherein memory appears as a group of independent addresses spaces (segments) to devices which access memory. As a result, segmentation provides a mechanism of isolating individual code, data and stacks into separate segments so that multiple programs (or tasks) can run on the same processor without interfering with one another. Therefore, to address a byte within a memory segment, a program issues a logical address which consists of a segment selector and an offset. The segment selector identifies the segment to be accessed and the offset identifies a byte in the address space of the segment.

Accordingly, source and destination operands in memory are referenced by a segment selector and an offset. The segment selector specifies the segment containing the operand and the offset (number of bytes from the beginning of the segment to the first byte of the operand) specifies the effective address of the operand. Alternatively, a linear address (Linear address=segment base+effective address), may be specified.

As such, under the segmentation memory model, memory is divided into various segments, which are each identified by a unique segment selector. In practice, the segment selector will identify a memory segment containing desired data, or operands, and will generally indicate a base start address of the segment, a segment limit and attributes of the segment within memory. Utilizing this base address, an offset can be specified in order to indicate a start position of desired data within the memory segment.

In one embodiment, computer system 100 may be configured to perform dynamic execution. As described above, dynamic execution requires a generation of micro-operations, which may be executed in an out-of-order fashion. Unfortunately, when dynamic execution is utilized in conjunction with the segmentation memory model, segment selector information accessed by various micro-operations may be lost as the various micro-operations execute in the out-of-order fashion. Consequently, segment selector information such as, for example, floating point segment selector information is generally stored in order to enable subsequent processing. Unfortunately, the storage of this segment selector information is further exacerbated by computer systems, which utilize register renaming in conjunction with dynamic execution, for example, as depicted with reference to FIG. 2.

Processor

Figure 2:
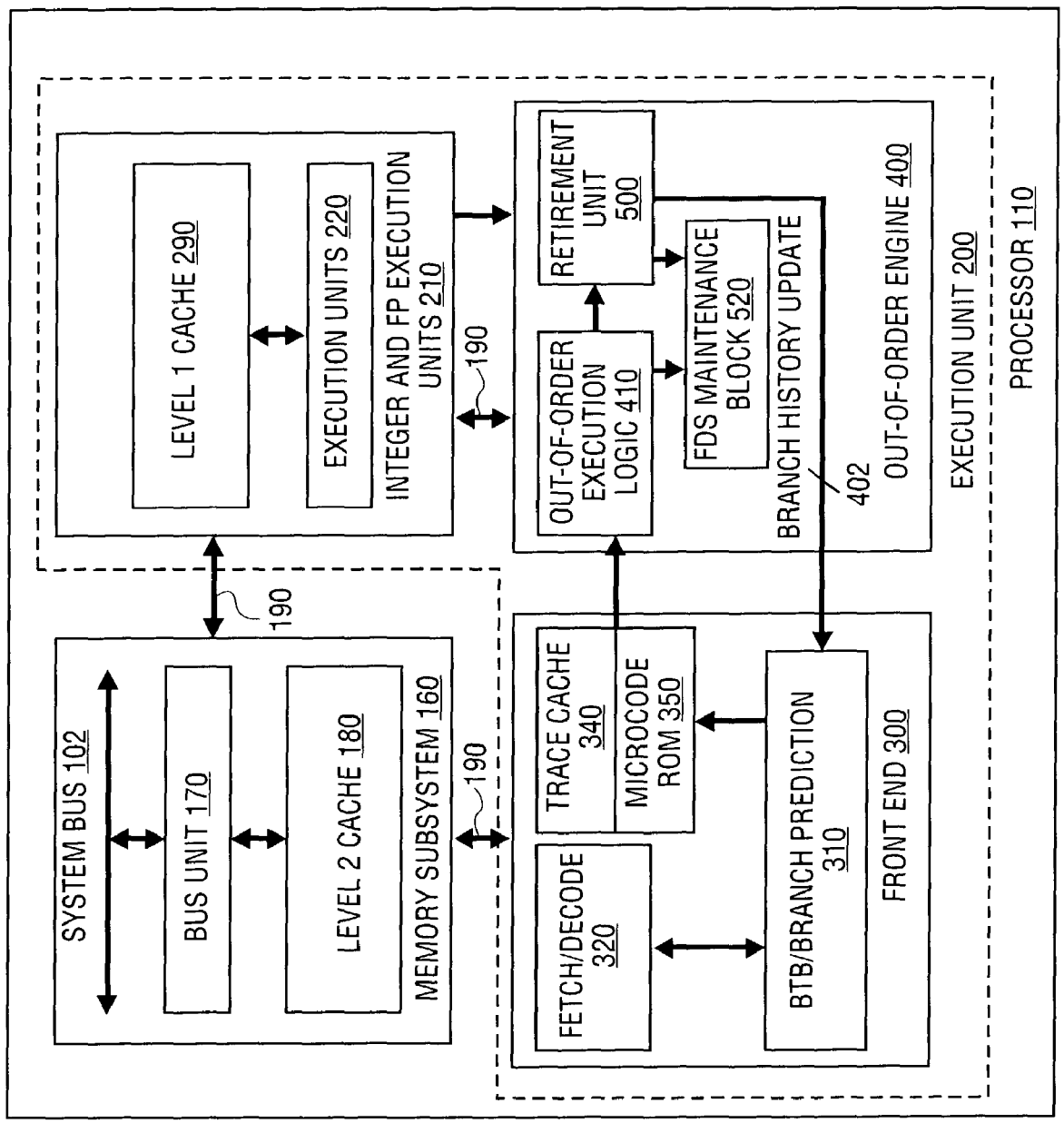
FIG. 2 depicts a block diagram further illustrating the processor, as depicted in FIG. 1, in accordance with the further embodiment of the present invention.

Referring now to FIG. 2, FIG. 2 depicts a block diagram further illustrating the processor 110, as depicted in FIG. 1, in accordance with a further embodiment of the present invention. As depicted in FIG. 2, the processor 110 is configured to perform "Dynamic Execution", which greatly improves the functionality and efficiency of the processor, as compared to conventional processors. As described above, Dynamic Execution utilizes front end logic that fetches the next instructions, according to a program order, and prepares the instructions for subsequent execution in the system pipeline.

In order to perform Dynamic Execution, the front end logic is utilized to decode basic operations or macro-instructions into one or more micro-operations (uOPs), which are then executed within the various components of the execution unit. As such, these micro-operations are assigned to a Dynamic Execution unit, along with a sequence number assigned to each micro-operation. Once received, micro-operations are scheduled to avoid stalling when following delayed instructions. In other words, micro-operations are executed in an "out-of-order" execution fashion when required to ensure the most efficient use of available processor resources.

However, in order to best utilize out-of-order execution, register renaming logic is required to rename logical registers in order to utilize a 144-entry physical register file. Generally, the renaming logic is required for dynamically expanding legacy, architectually defined register files to utilize current expanded register files and enable dynamic execution of legacy instructions. In addition, renaming is utilized to prevent serialization of the instruction pipeline in an out-of-order processor when a logical segment register read is followed by a write to the same logical segment register. This leads to higher performance since fewer serializations are required.

Unfortunately, renaming segment registers containing segment selector information associated with floating point (FP) macro-instructions complicates the storing of the segment selector information identifying a segment in memory containing accessed data. Consequently, when an FP-macro-instruction accesses memory, a segment selector is stored within a segment register, which may be renamed, thereby requiring mechanisms for storing or maintaining the FP-macro-instruction's segment selector information.

In accordance with the Intel® x86 architecture, the data segment accessed by the last non transparent FP macro-instruction is referred to as the floating point data segment (FDS). Consequently, FDS is updated with the information contained in the renamed segment register used with FP memory operation once the macro-instruction completes execution so that a subsequent FP state save instruction can access the correct FDS. In addition, under certain circumstances, software access to the renamed source segment information is vital in order to resolve events triggered by the FP micro-operations.

There are several FP events (invalid, denormal, divide by zero, exponent overflow, exponent underflow, precision) and each of these events can be programmed as a masked or unmasked event. In the masked case, the exceptions (FP events) are automatically handled producing a predefined (and often times usable) result, while allowing program execution to continue undisturbed. In the unmasked case, a software exception (event) handler is invoked to handle the exception. Consequently, the software handler requires access to the source segment register of the eventing instruction in order to properly handle the event.

However, invocation of the software event handler does not occur until a period of time following detection of the event; namely, the execution of the next non-transparent FP instruction following detection of the event, where non-transparent FP macro-instructions are those that do not execute if there are unmasked FP exceptions, but instead invoke a software handler. Since the renamed source segment can be allocated for another segment before the software handler is invoked, it is essential that the renamed source segment is saved away for later use by the software handler. Unfortunately, current mechanisms for saving the segment selector of the memory referencing FP-macro-instruction are unduly complicated. As such, one embodiment of the present invention describes a new protocol for maintaining floating point data segment selector information.

Referring again to FIG. 2, the execution unit 200 of processor 110 is further depicted and utilizes front end logic 300, out-of-order engine 400 and integer and floating point (FP) execution units 210. As described above, the front-end logic 300 fetches the upcoming program instructions for execution and prepares the instructions for future use within the system pipeline. In effect, the front-end logic supplies a high bandwidth stream of decoded instructions to the out-of-order engine 400, which performs the actual completion of the instruction. However, in order to execute the instructions in the most efficient fashion, the front-end logic 300 utilizes highly accurate branch prediction logic received from out-of-order engine 400 in order to speculate where the program is going to execute next, or as referred to herein, as "Dynamic Execution".

Accordingly, once the instruction address is predicted, the front-end branch prediction logic 310 is used to fetch instruction bytes from the level two cache 180 of memory subsystem 160. Once the instructions are fetched, the instructions are decoded into basic operations, referred to herein as micro-operations (uOPs), which the execution units 210 executes. The out-of-order execution logic 410 has several buffers that are utilized to reorder the flow of instructions in order to optimize performance as the reordered instructions flow down the system pipeline in preparation for execution scheduling. In effect, the instructions are aggressively reordered to allow the instructions to execute as quickly as their input operands are ready.

As a result of the out-of-order or Dynamic Execution, retirement unit 110 is utilized to reorder instructions executed in an out-of-order manner back into their original program order. The retirement unit 500 receives the completion status of the executed instructions from the execution units and processes the results so that a proper architectural state is committed (or retired) according to the program order. In one embodiment, the retirement unit 500 can retire up to three micro-operations per clock cycle. In the embodiments depicted, the retirement unit 500 ensures that exceptions occur if the operation causing the exceptions is the oldest, non-retired operation in the machine 100.

Figure 3:
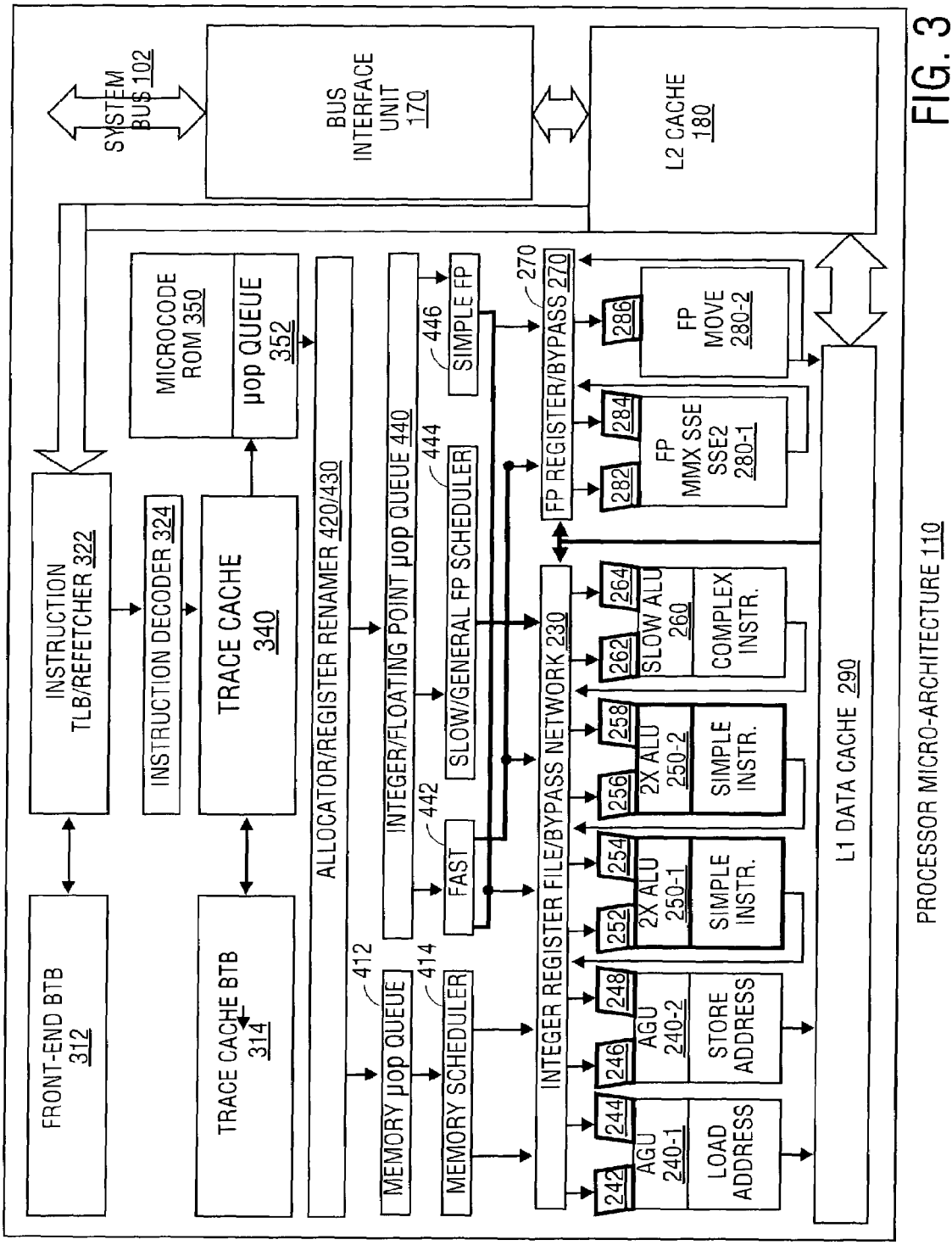
FIG. 3 depicts a block diagram further illustrating the processor, as depicted in FIG. 2, in accordance with the further embodiment of the present invention.

Referring now to FIG. 3, FIG. 3 further illustrates a processor 110, as depicted in FIGS. 1 and 2, by providing a block diagram that illustrates a processor micro-architecture 110 implementing a new protocol for maintaining a floating point data segment selector information in accordance with a further embodiment of the present invention. As depicted, the front-end logic 300, as illustrated in FIG. 2, is further illustrated within the top left-hand portion of FIG. 3. As illustrated, the front-end prediction logic 300 further includes front-end branch target buffer (BTB) 312, as well as trace cache BTB 314, which are utilized by prefetcher 322, as well as instruction decoder 324, to provide micro-operations to trace cache 340. Accordingly, micro-operations from both the trace cache 314 and the micro-code ROM 350 are provided to the uOPs queue 352. Together these components form front-end logic 300, as depicted in FIG. 2.

The out-of-order engine 400, as depicted in FIG. 2, is further illustrated with reference to FIG. 3 within the left-center portion of processor micro-architecture 110. As depicted, the uOP queue 352 provides micro-operations to the out-of-order engine 400, which includes allocator/register renamer 420/430. The allocator/register renamer 420/430 allocates the micro-operations to the memory uOP queue 412, as well as the integer/FP uOP queue 440. As illustrated, the various micro-operations are scheduled via memory schedule 414 or FP scheduler 444 and passed on integer/FP execution unit 210, which collectively form out-of-order engine 400 as depicted in FIG. 2.

The integer/FP execution units 210, as depicted in FIG. 2, are also further illustrated at the bottom left of the processor micro-architecture 110, as depicted in FIG. 3. As illustrated, micro-operations are provided from out-of-order engine 400 to register file 230 or floating point register 270 of the integer and FP execution units 210, as depicted in FIG. 2. As such, the execution units 210 include the various arithmetical logical units (ALU), as well as the address generation units (AGUs) that are utilized to process integer micro-operations, as well as floating point micro-operations. In effect, the floating point execution cluster is configured to perform multimedia (MMX), as well SSE/SSE2 instructions. Unfortunately, as described above, the register renamer 430 is configured to rename segment registers in order to make the most efficient use of the various register files utilized within processor micro-architecture 110 which exacerbates the problem of maintaining source segment information within a system configured according to the segmentation memory model.

Figure 4:
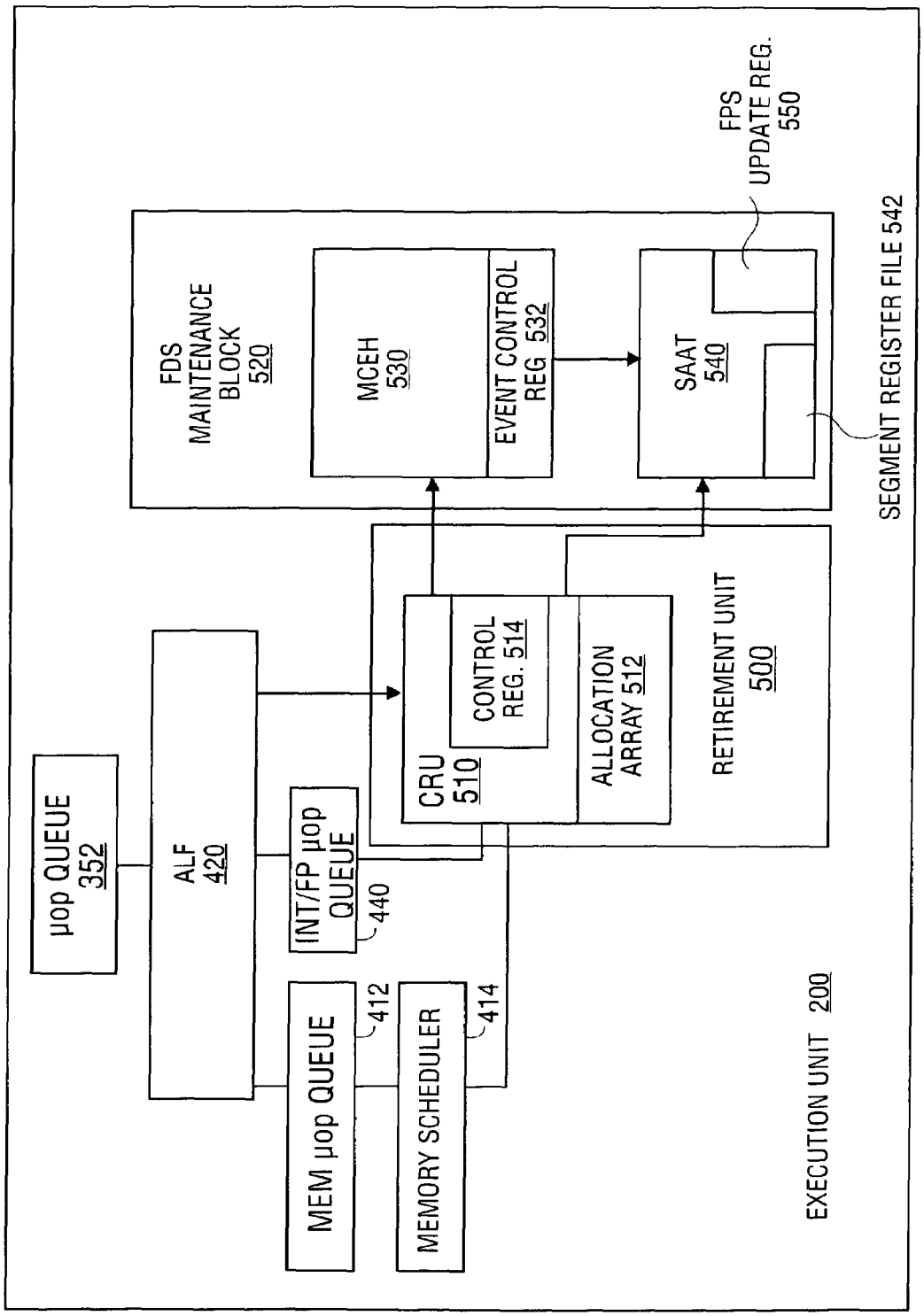
FIG. 4 depicts a block diagram illustrating a retirement unit within the processor, as depicted in FIGS. 2 and 3, in accordance with an exemplary embodiment of the present invention.

Accordingly, as depicted with reference to FIG. 4, retirement unit 500 as well as FDS maintenance block 520 of execution unit 200 are further illustrated. As depicted, the retirement unit 500 includes a checker and retirement unit (CRU) 510 that works in conjunction with a micro-code event handler (MCEH) 530, as well as segment and address translation unit (SAAT) 540 of FDS maintenance block 520 to maintain FP-segment selector information for memory referencing FP-macro-instructions. As described above, maintenance of FP segment selector information is required to enable subsequent use of the segment selector information by, for example, software in order to process events which may be triggered by the various micro-operations.

The retirement unit 500 and FDS maintenance logic 520, as depicted in FIG. 4, are now described with reference to maintaining FP data segment selector information for FP-memory referencing macro-instructions in accordance with one embodiment of the present invention. However, those skilled in the art will recognize that the embodiments described with reference to the present invention may be utilized in order to save segment selector information associated with the various macro-instructions executed within processor 110.

Generally, floating point macro-instructions can be classified as one of two types: memory referencing and non-memory referencing. However, some FP-macro-instructions may operate on memory, but are not defined as memory referencing. For example, arithmetic operations that operate on memory may be defined as memory referencing, while control instructions, which operate on memory, may not be classified as memory referencing. Accordingly, when a memory referencing macro instruction is decoded into one or more micro-operations (for dynamic execution), one of the micro-instructions, either a floating point load instruction (FP_LOAD) or a floating point store address micro-operation (FP_STOR_ADDR) will include a floating point data segment selector (FDS) update modifier. As described herein, FDS refers to the segment selector of the data segment associated with the memory access of a last floating point non-transparent macro-instruction.

As described above, the segment selector identifying the memory segment containing the data accessed by the FP-macro-instruction is stored within a segment register. However, as described above, the segment register may be lost unless a mechanism is provided to maintain the segment selector information (FDS will be lost if not recorded by the time FP instruction retires). As a result, decoding of macro-instructions into corresponding micro-operations will include either an FP_LOAD or an FP_STOR_ADDR micro-operations, as described below:

sink:=fp_load (store_address). save_FDS_FLA
(*@segment_src: (@base_BBB)+
[@index_III*@scale_SS]+<@displacement>)        (1)

As indicated, the FDS update modifier (save_FDS_FLA) references the segment selector (*@segment_src), which is a pointer to the memory segment containing the accessed data. In addition, the FDS update modifier (memory micro-operation) specifies a base register, where @segment_src refers to the segment, and @base_bbb, refers to the base register, and an index (@index_III), as well as a scale (@scale_SS) plus a displacement. Together, the base, index, scale and displacement determine an offset from a base of the memory segment to a start address of the data within the memory segment.

Consequently, in accordance with one embodiment of the present invention, the decoding of FP-macro-instructions into corresponding micro-operations is defined such that, when corresponding micro-operations are generated, the micro-operation, including the FDS update micro-operation modifier, is the final, memory-referencing micro-operation generated from the decoded macro-instruction. As a result, once an FDS update micro-operation is retired, maintenance of FDS information is performed. Otherwise, an end of macro-instruction (EOM) is required for performing maintenance of the FDS information.

Accordingly, uOPs decoded from memory referencing macro-instructions generally have an associated FDS update uOP. As such, this FDS update uOP will generally have an associated source memory segment. However, register renamer functionality 430 renames this source memory segment and a physical segment (PSEG) associated with the source segment is written into a CRU allocation array 512 by allocation and free list manager (ALF) 425, which is part of allocator 420, as depicted in FIG. 3. On retirement of the FDS update uOP, the renamed physical segment is copied from the allocation array 512 and stored in a CRU control register 514.

However, a number associated with the renamed PSEG is stored in control register 514. In other words, the actual PSEG is not stored in control register 514; the contents of control register 514 are limited to a reference number associated with the renamed PSEG. In the event that the respective load/store uOP signals a floating point event, the CRU 510 provides the renamed physical segment information in an event info control register 532 of micro-code event handler (MCEH) 530. Accordingly, MCEH 520 updates the control register 514 of CRU 510, once the floating point event is resolved, with the renamed physical segment.

As a result, on retirement of a floating point macro-instruction, which is comprised of the respective micro-operations, a segment address and translation (SAAT) unit 540, is sent a signal by the CRU 510 in order to update physical segment information into a segment register file 542. As such, once the SAAT 540 copies the named physical segment information into segment register file 542, maintenance of the FDS information is complete. Consequently, devices including software may have access to the FDS information in order to resolve micro-code events.

Unfortunately, this conventional FDS maintenance process requires complicated functionality within CRU 510 in order to detect memory referencing macro-instructions, as well as detecting and maintaining states in order to keep track of the FDS update modifiers associated with decoded uOPs. Moreover, FDS update maintenance is delayed until a floating point end of macro-instruction (FP_EOMs) is detected. Furthermore, the complexity of conventional FDS maintenance lacks a clear interface to the FDS update device 540 of FDS maintenance block 520.

Therefore, in accordance with one embodiment of the present invention, multi-store and multi-load macro instructions are modified such that load/store micro-operations with a FDS update modifier are always the last memory micro-operation generated for a memory referencing macro-instruction. Accordingly, macro-instructions are subject to the limitation that uOPs (load or store with the FDS update modifier) are the last memory uOP in non-transparent FP macro-instructions. As a result, the occurrence of non-FP event signaling uOPs, following detection of an FDS update modifier, is prohibited. Consequently, an FP state can be committed if the load/store uOP with the FDS update modifier does not signal a memory related event. Consequently, updating of the FDS information need not be postponed until an FP_EOM micro-op is detected, as required by the conventional FDS maintenance process.

As described above, the retirement unit 500 can retire up to three uOPs in one memory clock cycle (MCLK). Therefore, it is possible to have 0, 1, 2 or 3 FDS update modifiers in one retirement window. As described herein, a memory clock "retirement window" is defined according to a memory clock cycle of the system clock. During a memory clock retirement window, the CRU 510 is configured to determine which uOP updates the FDS information (the last detected uOP within the retirement window). As such, once the CRU 510 determines the uOP that will update the FDS information, the CRU 510 asserts a control signal (FDS update signal) and writes the control signal to the SAAT 540 (FDS update device). Next, the CRU 510 reads the physical segment associated with the uOP and transmits the physical segment to the SAAT 540.

In response to assertion of the update signal, the SAAT 540 reads the entry corresponding to the renamed PSEG shipped by the CRU 510 and copies the contents into a physical segment assigned for the FDS information within segment register file 532. As such, the CRU 510 does not have to wait for detection of the FP_EOM uOP in order to complete the update of the FDS information. However, the last detected uOP within the retirement window may signal a floating point (FP) event. When such is the case, the CRU 510 will copy the physical segment associated with the detected uOP within an event control register 532 of MCEH 530.

As a result, the FDS information is not updated by the CRU 510 or SAAT 540 when the detected uOP signals an event. In one embodiment, it is the responsibility of the MCEH 530 to complete the update of FDS information when the detected uOP signals an FP event. Since the renamed physical segment value assigned to the FDS information is accessible to the MCEH 530, the MCEH 530 is configured to inform the SAAT 540 that it is required to copy the PSEG information containing the FDS information. As a result, the embodiments of the present invention include an FPS update register 550 within SAAT 540, which is utilized to provide a control register interface between the MCEH 530 and the SAAT 540 of the FDS maintenance block 520. In another embodiment, MCEH 530 can provide CRU 510 the PSEG and request CRU 510 to inform the SAAT 540. With that approach, the CRU-SAAT interface can be used for MCEH updates of FDS and there is no need for a new MCEH-SAAT interface.

Accordingly, once the MCEH 530 is activated in response to detection of an FP event, the MCEH 530, prior to termination, will copy the renamed physical segment into the FP update register 550. Accordingly, in one embodiment, the SAAT 540 is configured to detect a FP update whenever the FP selector update register 550 is written to by MCEH 530. As a result, when the SAAT 540 detects such a condition, the SAAT 540 will copy physical segment information into segment register 540 in order to complete the FDS maintenance update.

In one embodiment, the FDS information refers to a segment selector including a pointer to a memory segment containing the accessed data segment selector, as well as a base address indicating a start address of the memory segments and an offset from the base address wherein the data is located. In one embodiment, maintenance of FDS information is performed according to a one-shot operation. Consequently, in order to implement micro-code event handler triggering of the FDS update, writes to the FDS update register 540 are limited to the MCEH 530 and corresponding FP event handler (FPEH) micro-code.

In addition, the FDS update maintenance protocol described by the present invention, in one embodiment, ensures that the CRU 510 and the MCEH 530 will not assert an FDS update signal simultaneously. In other words, the trigger signals for an FDS update are strong mutex. In addition, the FDS update register is duplicated for each thread running on the processor 110. Consequently, utilizing the FDS maintenance protocol, as described by one embodiment of the present invention, results in a CRU 510 which is no longer required to maintain any states or reset states on detection of FP_EOM signals.

Consequently, the FP_EOM signal is completely decoupled from FDS updates, and CRU logic 510 for FDS updates are simplified since CRU 510 decoding of all combinations of FP_EOM and FDS update flags in the same retirement window is eliminated. Moreover, improved efficiency described by the FDS maintenance protocol results in savings, which are even more significant if the number of uOPs retired per memory clock exceeds the three uOP retirement limit. Finally, the SAAT 540 is no longer required to copy physical segment information on detection of each FP_EOM signal. The copy operation is limited to memory event signaling FDS update uOPs.

Figure 5:
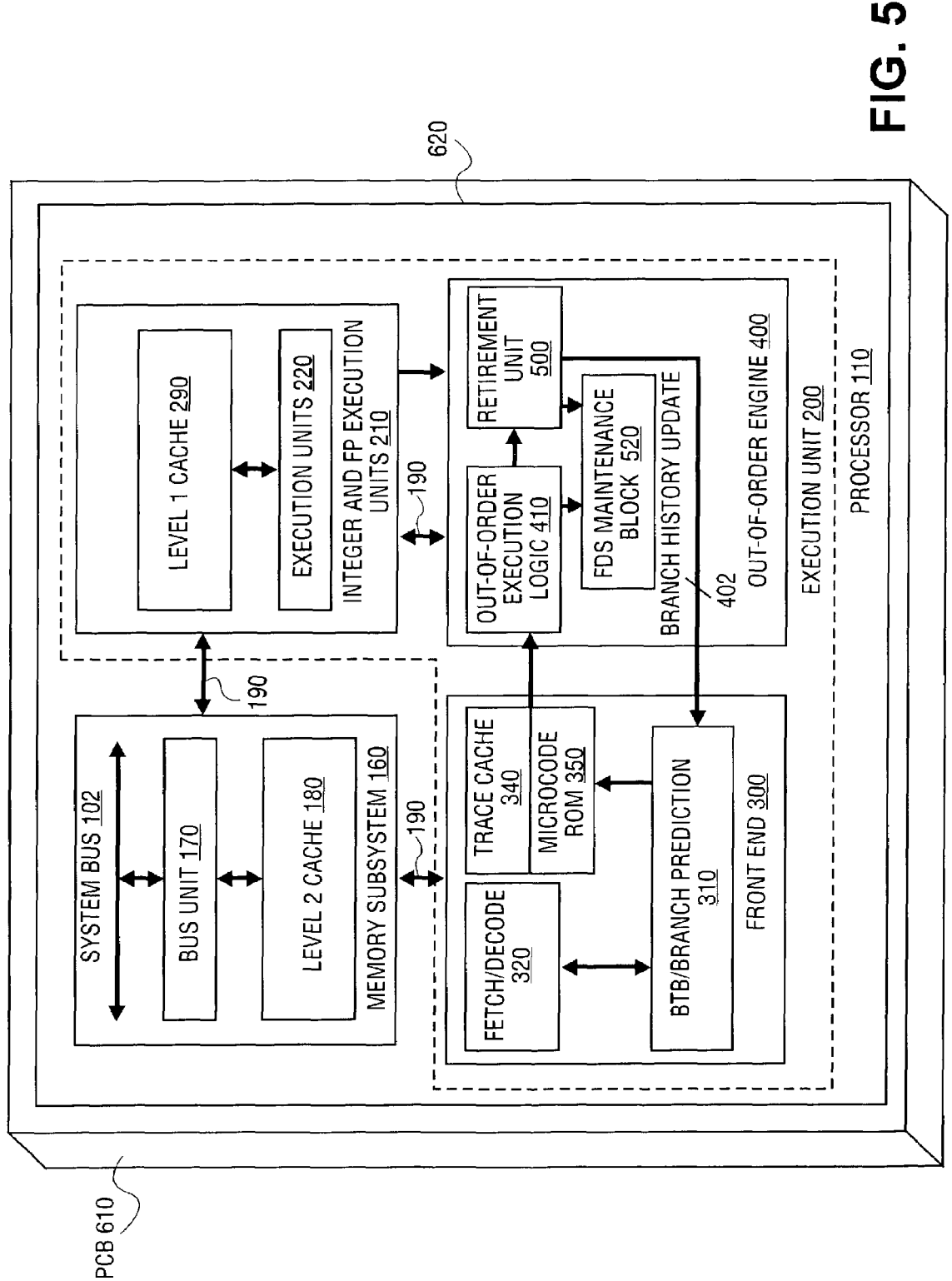
FIG. 5 depicts a block diagram illustrating an electronic system implementing a processor, as depicted in FIGS. 2–4, for implementing a computer system utilizing a new protocol for maintaining a floating point data segment, in accordance with a further embodiment of the present invention.

Referring now to FIG. 5, FIG. 5 depicts a block diagram illustrating an embodiment of an electronic system 600 in which retirement unit 500 implements a new protocol for maintaining floating point segment selector information to avoid loss of segment selector information due to segment register renaming. The system 600 includes a multi-layer printed wiring board (PCB) 610 on which a parallel bus may be formed. The bus may be of a point-to-point variety or multi-drop bus, such as utilized in main memory. An integrated circuit (IC) chip package is operatively installed on the bus to communicate, utilizing for example, a parallel bus.

In one embodiment, installation of the package 620 may be done by a service mount or through-hole attachment technique, or via a connector or socket. The package includes an IC chip (chip set) that is configured to function as processor 110, as depicted with reference to FIGS. 1–4. As illustrated, the logic function section of the IC chip processor 110 includes execution unit 200, which is configured to implement "Dynamic Execution". As a result of "Dynamic Execution" within a segmentation memory mode, as well as segment register renaming, retirement unit 500 in conjunction with FDS maintenance block 520 are configured to provide FDS maintenance in accordance with one embodiment of the present invention.

In doing so, one embodiment of the electronic system 600 provides simplified logic for detecting a final memory referencing micro-operation within a retirement window and effectively storing segment selector information associated with the detected micro-operation within a corresponding portion of a segment address translation unit, for example, as depicted in FIG. 4. Accordingly, utilizing the FDS maintenance protocol, checker and retirement unit logic complexity is drastically diminished in order to provide more reliable execution results when performing "Dynamic Execution".

Procedural methods for implementing embodiments of the present invention are now described.

Operation

Figure 6:
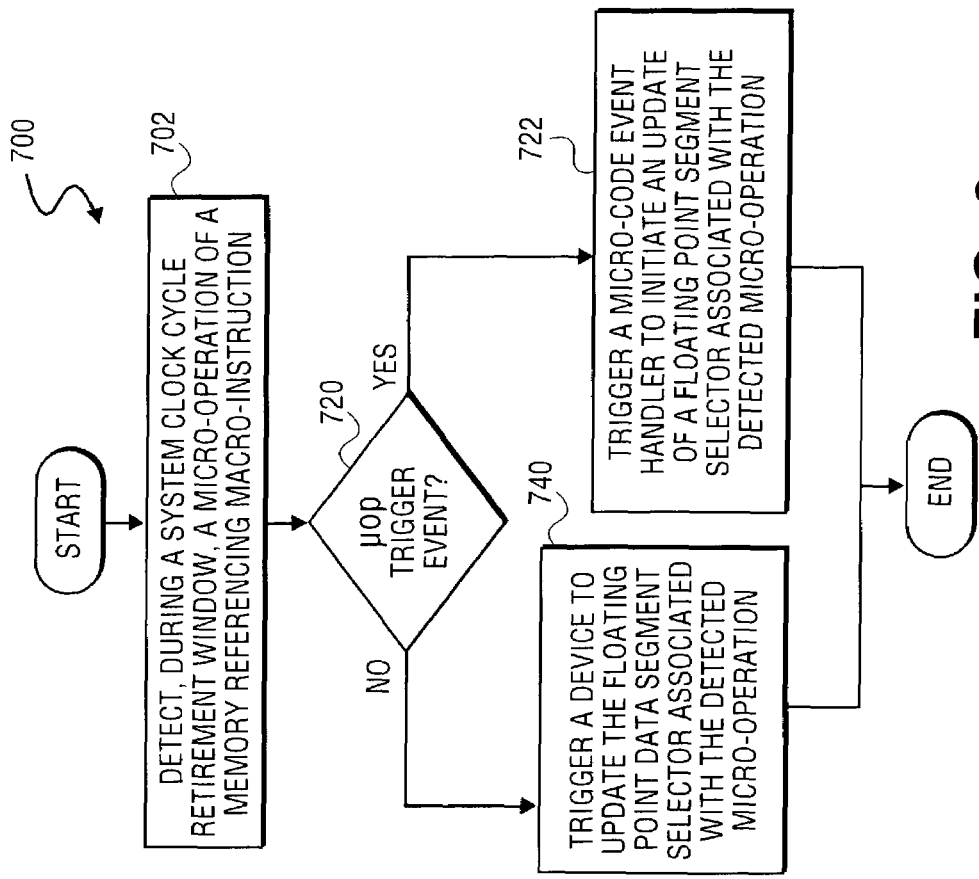
FIG. 6 depicts a flowchart illustrating a method for maintaining a floating point data segment selector in accordance with one embodiment of the present invention.

Referring now to FIG. 6, FIG. 6 depicts a flowchart illustrating a method 700 for maintaining an FDS information within processor micro-architecture 110, as depicted in FIGS. 2–5, in accordance with one embodiment of the present invention. Accordingly, at process block 702, a micro-operation of a memory referencing macro-instruction is detected during a system clock cycle retirement window. As described above, retirement units required for implementing for Dynamic Execution currently retire up to three micro-operations within a system clock cycle. As such, during the system clock cycle, a device such as, for example, CRU 510 (FIG. 4) is responsible for detecting the micro-operation of a memory referencing FP-macro-instruction.

Once detected, at process block 720, it is determined whether the uOP has triggered an event. When the detected micro-operation triggers an event, a micro-code event handler (MCEH) is triggered to initiate an update of a floating point data segment selector (FDS) associated with the detected micro-operation. In one embodiment, if the event triggered is a non-FP event, neither the CRU nor ucode update FDS and that is the architectural requirement. Otherwise, at process block 740, a device is triggered to update the FDS associated with the detected micro-operation. In one embodiment, the FDS update device refers FDS maintenance logic 522 including segment address and translation unit (SAAT) 540, as depicted in FIG. 4.

Figure 7:
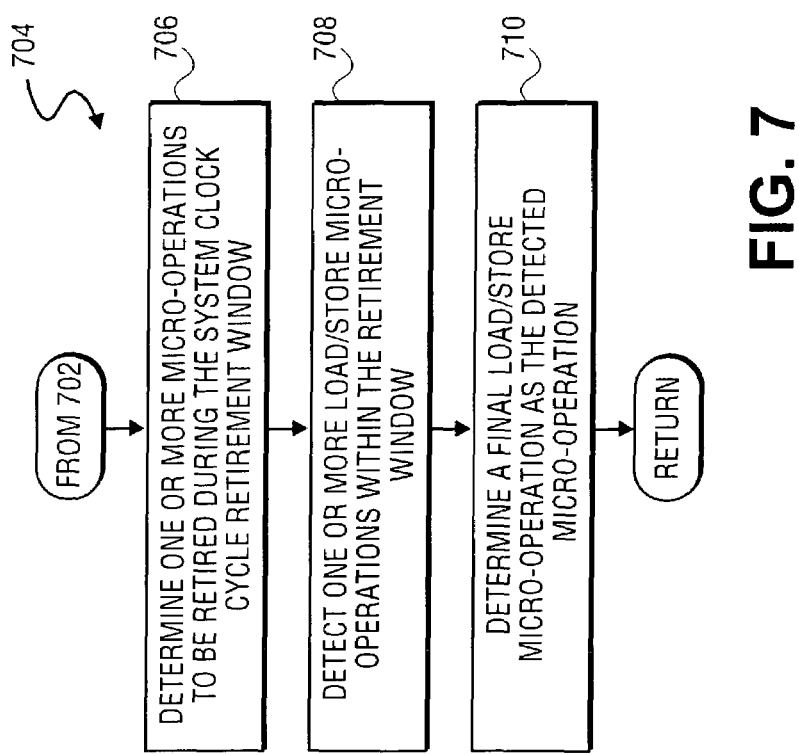
FIG. 7 depicts a flowchart illustrating an additional method for detecting a memory referencing micro-operation in accordance with the further embodiment of the present invention.

Referring now to FIG. 7, FIG. 7 depicts a flowchart illustrating an additional method 704 for detecting the micro-operation of process block 702, as depicted in FIG. 6. At process block 706, one or more micro-operations that are to be retired during the system clock cycle retirement window are detected. Once detected, at process block 708, one or more load/store micro-operations are detected from the one or more determined micro-operations within the retirement window.

Finally, at process block 710, a final load/store micro-operation is determined as the detected memory referencing micro-operation. In one embodiment, detection of the final load/store micro-operation is performed by detecting a final micro-operation having an associated FDS selector update modifier. When multiple FDS update modifiers are detected, a sequence number assigned to the micro-operations by the processor out-of-order engine is utilized in order to determine the final micro-operation of a memory referencing macro-instruction.

Referring now to FIG. 8, FIG. 8 depicts a flowchart illustrating an additional method 724 for triggering the micro-code event handler of process block 722, as depicted in FIG. 6. At process block 724, it is determined whether the detected micro-operation has triggered an event. Once the event is detected, at process block 728, a physical data segment containing the FDS information of the detected micro-operation is determined.

As described above, ALF 420 generally renames registers as part of the Dynamic Execution. Consequently, the selector information segment identifying the memory segment containing accessed data is required for software resolution of uOP triggered events. Accordingly, once the physical segment is detected, process block 730 is performed, wherein the physical segment is written into an event control register, which is consumed by the micro-code event handler. For example, as depicted with reference to FIG. 4, CRU 510 writes the detected physical segment into event control register 532 of MCEH 530.

Referring now to FIG. 9, FIG. 9 depicts a flowchart illustrating an additional method 732 for triggering the micro-code event handler of process block 722, as depicted in FIG. 6. At process block 734, the micro-code event handler detects the physical segment written to the event control register 540. Once detected, at process block 736, the micro-code event handler will read FDS information contained within the event control register. Finally, at process block 738, the micro-code event handler will write the FDS information within a corresponding portion of an FDS update register file. For example, referring again to FIG. 4, in one embodiment, MCEH 530 writes the FDS information contained in event control register 532 within FDS update register 550 of SAAT 540. Accordingly, writing of this information triggers the SAAT 540 to perform the FDS information update.

Figure 10:
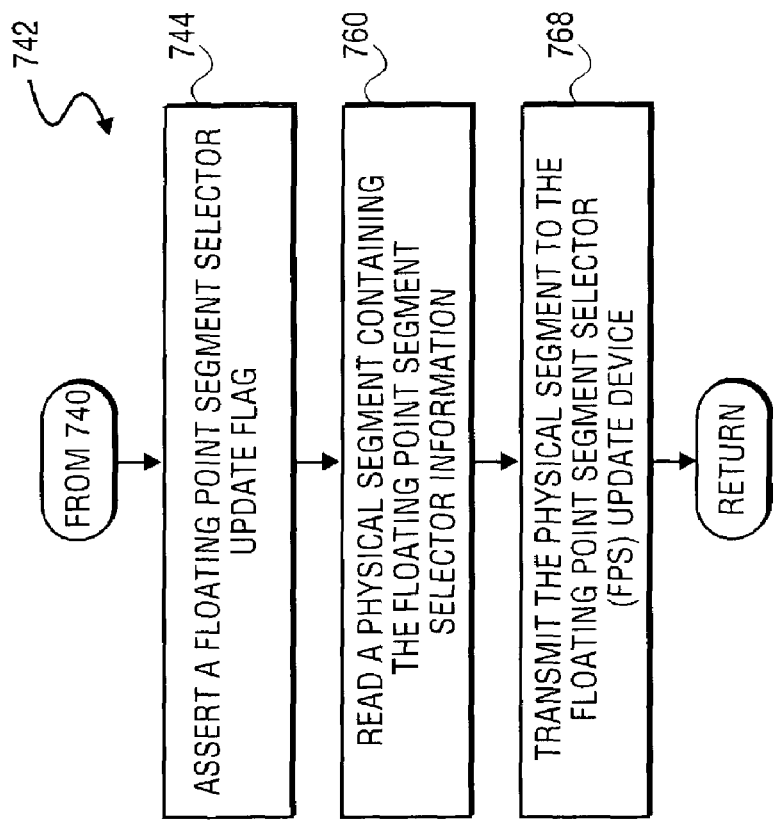
FIG. 10 depicts a flowchart illustrating an additional method for triggering a device floating point selector update in accordance with a further embodiment of the present invention.

Referring now to FIG. 10, FIG. 10 depicts a flowchart illustrating an additional method 742 for triggering a device FDS update of process block 740, as depicted in FIG. 6. At process block 744, an FDS update flag is asserted by, for example, CRU 510. Once asserted, at process block 760, a physical segment containing the FDS information of the detected micro-operation is read by, for example, CRU 510. Once read, at process block 768, the physical segment is transmitted to an FDS update device, such as for example, SAAT 540, as depicted in FIG. 4.

Figure 11:
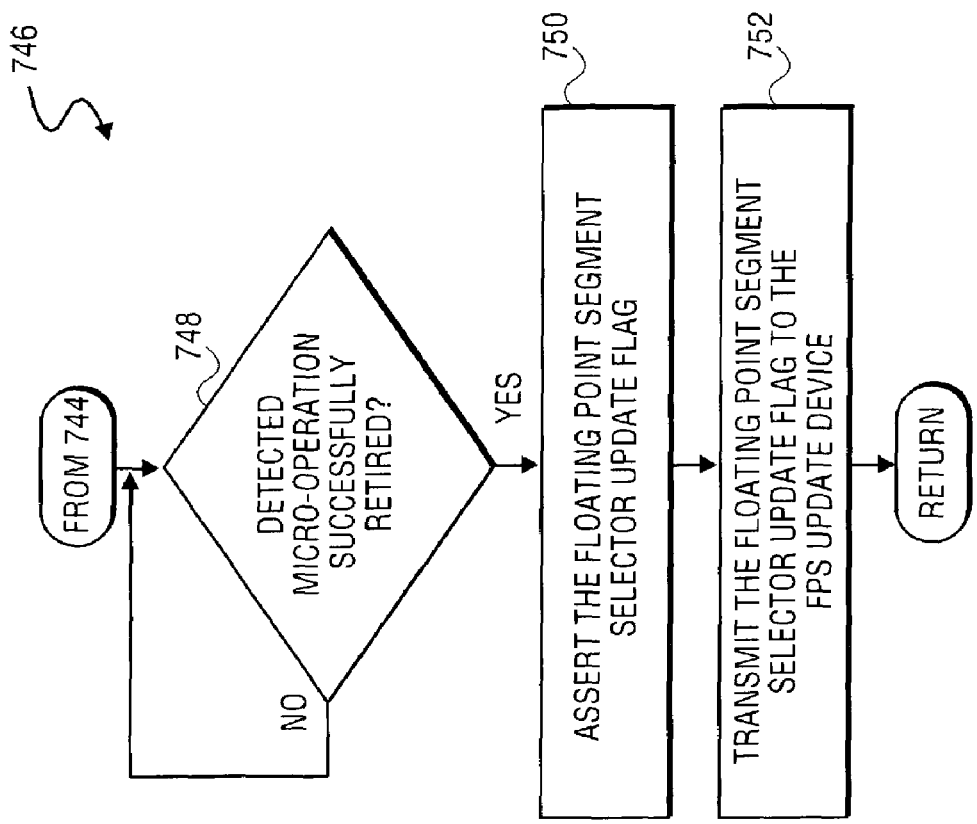
FIG. 11 depicts a flowchart illustrating an additional method for asserting a floating point selector update flag in accordance with the further embodiment of the present invention.

Referring now to FIG. 11, FIG. 11 depicts a flowchart illustrating an additional method 746 for asserting the FDS update flag of process block 744, as depicted in FIG. 10. At process block 748, it is determined whether the detected memory referencing micro-operation has successfully retired. Once detected, at process block 750, the FDS update flag is asserted by, for example, CRU 510. Finally, at process block 752, the FDS update flag is transmitted to the FDS update device, such as for example, SAAT 530 of FDS maintenance logic 520, as depicted in FIG. 4.

Figure 12:
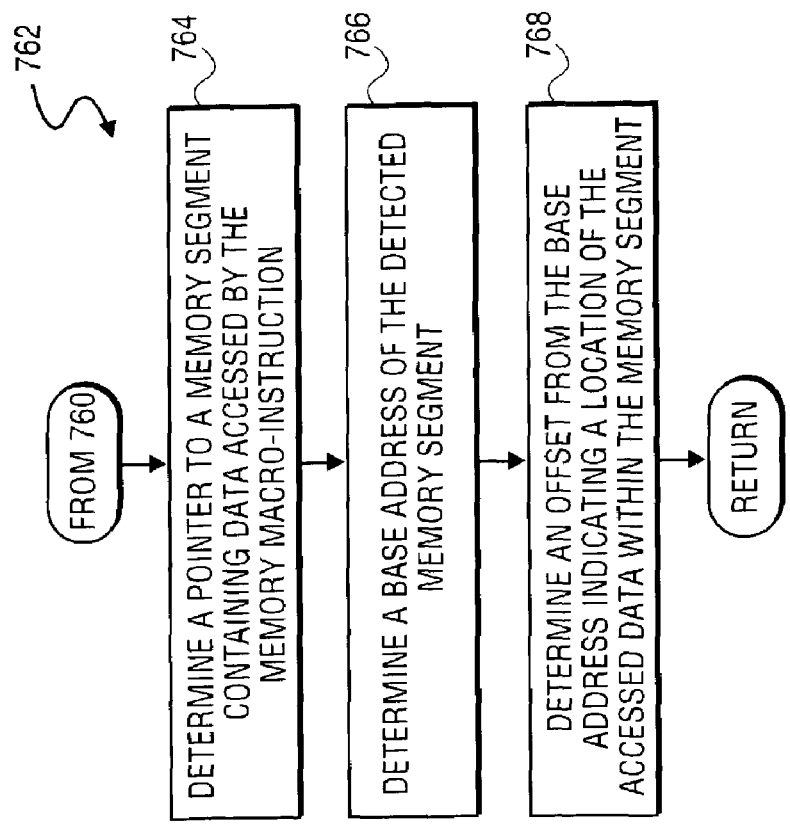
FIG. 12 depicts a flowchart illustrating an additional method for reading a physical segment containing floating point selector information in accordance with the further embodiment of the present invention.

Referring now to FIG. 12, FIG. 12 depicts a flowchart illustrating an additional method 762 for reading the physical segment containing the FDS information of process block 760, as depicted in FIG. 10. At process block 764, a pointer to a memory segment containing data accessed by the memory referencing macro-instruction is determined. Once determined, at process block 768, a base address of the detected memory segment referenced by macro-instruction is determined. Finally, at process block 768, an offset from the base address is determined. The offset from the base address identifies the location of the accessed data within the detected memory segment.

Accordingly, in the embodiment described with reference to FIG. 12, the FDS information refers to a pointer to a memory segment containing the accessed data and a base address of the detected memory segment accessed by the detected memory referencing macro-instruction. Utilizing this information, as well as an offset, subsequent micro-code, as well as devices including software, will have access to the original FDS information regardless of any segment register renaming in order to be able to resolve, for example, micro-operation triggered events and the like.

Figure 13:
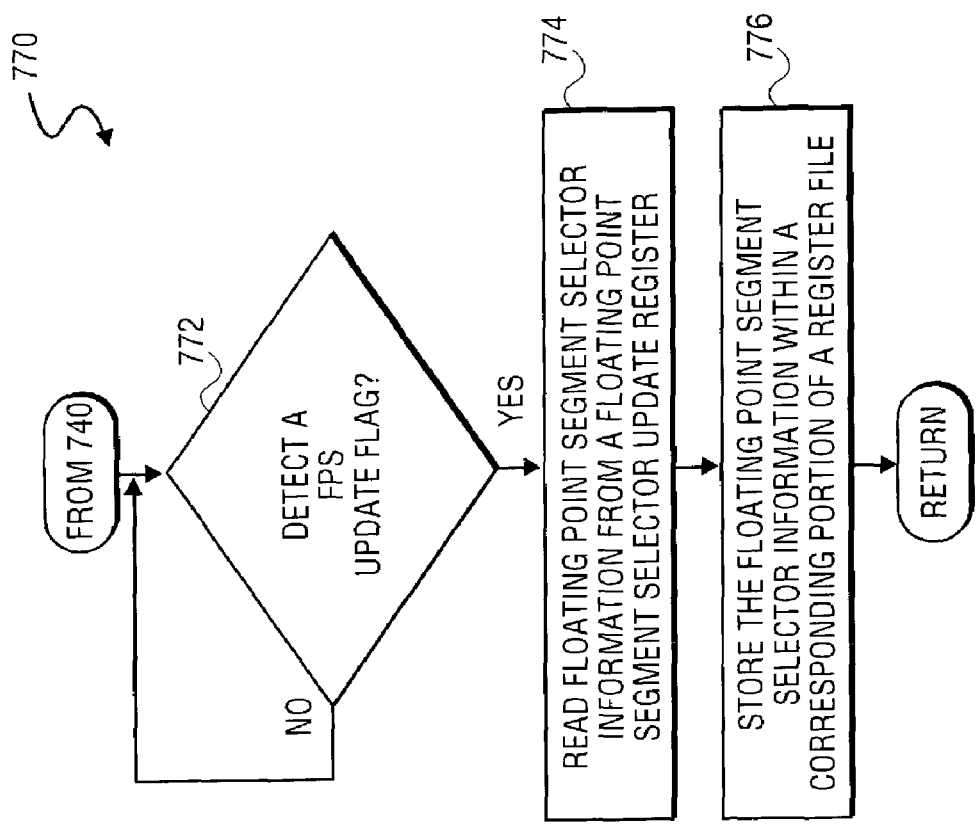
FIG. 13 depicts a flowchart illustrating an additional method for maintaining floating point data segment selector information in accordance with an exemplary embodiment of the present invention.

Referring now to FIG. 13, FIG. 13 depicts a flowchart illustrating an additional method 770 for updating FDS information of process block 740, as depicted in FIG. 6, in accordance with a further embodiment of the present invention. At process block 772, an FDS update device detects an FDS update flag. Once detected, at process block 774, the FDS update device reads FDS information from an FDS update register 540. Finally, at process block 776, the FDS update device 520 stores the FDS information within a corresponding portion of a register file.

For example, as depicted with reference to FIG. 4, SAAT 540 will detect an FDS update in response to an FDS update flag triggered by CRU 510. Once detected, the SAAT 540 will copy FDS information from control register 524 and store the FDS information within a corresponding portion of segment register file 542. Once the information is stored within second register file 542, the FDS update is complete, thereby enabling access to the FDS information by subsequent devices, which require the FDS information stored within segment register file 542 in order to resolve, for example, FP-events.

Figure 14:
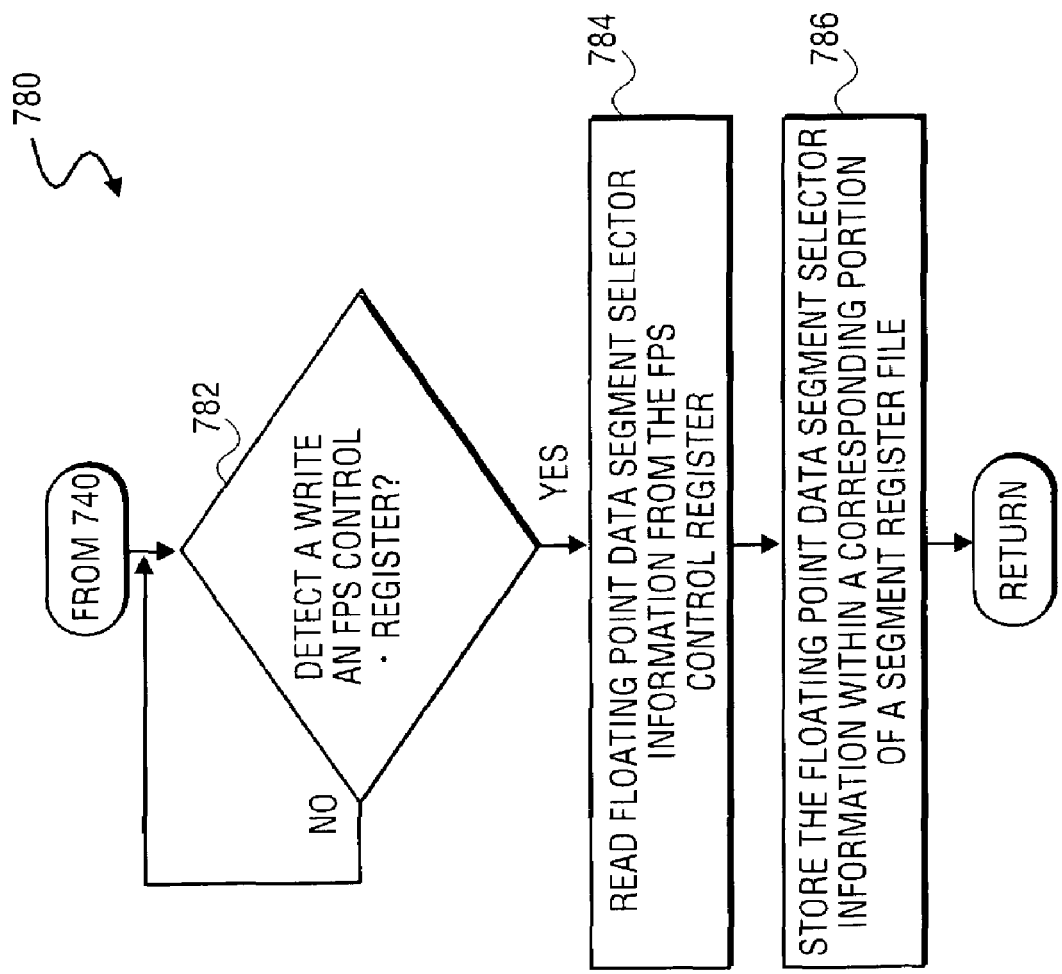
FIG. 14 depicts a flowchart illustrating an additional method for maintaining floating point date segment selector information in accordance with an exemplary embodiment of the present invention.

Finally, referring to FIG. 14, FIG. 14 depicts a flowchart illustrating an additional method 780 for maintaining FDS information of process block 740, as depicted in FIG. 6, in accordance with a further embodiment of the present invention. At process block 782, the FDS update device determines whether a write to an FDS update register is detected. Once detected, at process block 784, the FDS update device reads FDS information from an FDS update register. Finally, at process block 786, the FDS update device stores the FDS information, read from the FDS update register, into a corresponding portion of a segment register file.

Accordingly, as depicted with reference to FIG. 4, the additional method 780, as depicted with reference to FIG. 14, describes a process for FDS update maintenance when a detected memory referencing micro-operation triggers a floating point event. Otherwise, when the detected memory of referencing operation does not trigger an event, the process and method 770, as depicted with reference to FIG. 13, is performed. Accordingly, as depicted with reference to FIG. 14, when the detected memory referencing operation triggers an event, the CRU 510 provides MCEH 530 with a reference to the FDS information, which is stored with an FDS update register 550 of SAAT 540 in order to trigger the FDS update.

Otherwise, the SAAT 540 is triggered to perform the update by the FDS update flag, which is triggered by the CRU during non-eventing micro-operation detection. Consequently, utilizing embodiments of the present invention, CRU logic for detecting various retirement of micro-operations, as well as detection of end-of-macro instruction flags, is avoided. In fact, the FP_EOM signal is completely decoupled from the FDS update protocol described according to the embodiments of the present invention. As such, the CRU 510 is allowed to complete FDS updates once the detected memory referencing micro-code operation is retired.

Alternate Embodiments

Several aspects of one implementation of the retirement unit for maintaining a floating point data segment have been described. However, various implementations of the retirement unit provide numerous features including, complementing, supplementing, and/or replacing the features described above. Features can be implemented as part of out-of-order execution logic or as part of the separate processor logic in different embodiment implementations. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

In addition, although an embodiment described herein is directed to a retirement unit for maintaining a floating point data segment, it will be appreciated by those skilled in the art that the embodiments of the present invention can be applied to other systems. In fact, systems for maintaining rename segment data other than floating point operations are within the embodiments of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of various embodiments of the present invention to the full extent indicated by the broad general meaning of the terms in which the appended claims are expressed.

The embodiments of the present invention provides many advantages over known techniques. In one embodiment, the present invention includes the ability to utilize a checker and retirement unit, which is free from maintaining any states or resets associated with floating end of macro-instruction micro-operations. In addition, the end of macro-instruction micro-operation is completely decoupled from floating point data segment selector updates, as well as checker retirement unit logic for floating point data segment selector updates. In addition, the requirement for decoding all combinations of the end of macro-instruction during a retirement window is avoided. Moreover, needless copying of floating point data segment selector information is avoided.

Having disclosed exemplary embodiments and the best mode, modifications and variations may be made to the disclosed embodiments while remaining within the scope of the invention as defined by the following claims.

What is claimed is:

1. A method comprising:
   detecting, during a system clock cycle retirement window, a micro-operation decoded from a memory referencing macro-instruction the detected micro-operation having a floating point data segment selector update modifier;
   when the detected micro-operation triggers an event, triggering a micro-code event handler to initiate an update of a floating point data segment selector information associated with the detected micro-operation; and
   otherwise, triggering a device to update the floating point data segment selector information associated with the detected micro-operation.

2. The method of claim 1, wherein detecting the memory referencing micro-operation further comprises:
   determining one or more micro-operations to be retired during the system clock cycle retirement window;
   detecting one or more load/store micro-operations from the one or more determined micro-operations within the retirement window; and determining a final load/store micro-operation as the detected memory referencing micro-operation.

3. The method of claim 2, wherein detecting the final load/store micro-operations further comprises:
  detecting at least two micro-operations having a floating point data segment selector update modifier as the one or more detected load/store micro-operations; and
  selecting the final load/store micro-operation for the at least two detection micro-operations according to a respective sequence number assigned to the detected micro-operations.

4. The method of claim 1, wherein triggering the micro-code event handler further comprises:
  detecting an event triggered by the detected micro-operation;
  once the event is detected, determining a physical data segment containing the floating point data segment selector information of the detected micro-operation; and
  writing the physical segment into an event control register utilized by the micro-code event handler.

5. The method of claim 4, further comprising:
  detecting, by the micro-code event handler, the physical segment written to the event control register;
  reading, by the micro-code event handler, the floating point data segment selector information contained within the event control register; and
  writing, by the micro-code event handler, the floating point data segment selector information to a corresponding portion of a floating point segment selector update register file.

6. The method of claim 1, wherein triggering the device floating point data segment selector update further comprises:
  asserting a floating point selector update flag;
  reading a physical segment containing the floating point data segment selector information associated with the detected micro-operation; and
  transmitting the physical segment to the floating point data segment selector update device.

7. The method of claim 6, wherein asserting the floating point selector update flag further comprises:
  determining whether the detected micro-operation has successfully retired;
  once the detected micro-operation has successfully retired, asserting the floating point segment selector update flag; and
  transmitting the floating point selector update flag to the floating point segment selector update device.

8. The method of claim 6, wherein reading the physical segment further comprises:
  determining a pointer to a memory segment containing data accessed by the memory referencing macro-instruction;
  determining a base address of the detected memory segment; and
  determining an offset from the base address indicating a location of the accessed data within the memory segment.

9. The method of claim 1, further comprising:
  detecting, by a floating point segment selector update device, a floating point segment update selector flag;
  once detected, reading by the floating point segment selector update unit, floating point data segment selector information from a floating point data segment selector update register; and
  once read, storing the floating point data segment selector information within a corresponding portion of a segment register file.

10. The method of clam 1, further comprising:
  detecting, by a floating point selector update device, a write to a floating point segment selector control register;
  once detected, reading floating point data segment selector information from the floating point selector control register; and
  storing the floating point data segment selector information within a corresponding portion of a register file.

11. A computer readable storage medium including program instructions that direct a computer to function in a specified manner when executed by a processor, the program instructions comprising:
  detecting, during a system clock cycle retirement window, a micro-operation decoded from a memory referencing macro-instruction, the detected micro-operation having a floating point data segment selector update modifier;
  when the detected micro-operation triggers an event, triggering a micro-code event handler to initiate an update of a floating point data segment selector information associated with the detected micro-operation; and
  otherwise, triggering a device to update the floating point data segment selector information associated with the detected micro-operation.

12. The computer readable storage medium of claim 11, wherein detecting the memory referencing micro-operation further comprises:
  determining one or more micro-operations to be retired during the system clock cycle retirement window;
  detecting one or more load/store micro-operations from the one or more determined micro-operations within the retirement window; and
  determining a final load/store micro-operation as the detected memory referencing micro-operation.

13. The computer readable storage medium of claim 12, wherein detecting the one or more load/store micro-operations further comprising:
  detecting at least two micro-operations having a floating point data segment selector update modifier as the one or more detected load/store micro-operations; and
  selecting the final load/store micro-operation for the at least two detection micro-operations according to a respective sequence number assigned to the detected micro-operations.

14. The computer readable storage medium of claim 11, wherein triggering the micro-code event handler further comprises:
  detecting an event triggered by the detected micro-operation;
  once the event is detected, determining a physical data segment containing the floating point data segment selector information of the detected micro-operation; and
  writing the physical segment into an event control register to trigger the micro-code event handler.

15. The computer readable storage medium of claim 14, further comprising:
  detecting, by the micro-code event handler, the physical segment written to the event control register;
  reading, by the micro-code event handler, the floating point data segment selector information contained within the event control register; and writing, by the micro-code event handler, the floating point data segment selector information to a corresponding portion of a floating point segment selector update register file.

16. The computer readable storage medium of claim 11, wherein triggering the device floating point data segment selector update further comprises:
asserting a floating point selector update flag;
reading a physical segment containing the floating point data segment selector information associated with the detected micro-operation; and
transmitting the physical segment to the floating point data segment selector update device.

17. The computer readable storage medium of claim 16, wherein asserting the floating point selector update flag further comprises:
determining whether the detected micro-operation has successfully retired;
once the detected micro-operation has successfully retired, asserting the floating point segment selector update flag; and
transmitting the floating point selector update flag to the floating point segment selector update device.

18. The computer readable storage medium of claim 16, wherein reading the physical segment further comprises:
determining a pointer to a memory segment containing data accessed by the memory referencing macro-instruction;
determining a base address of the detected memory segment; and
determining an offset from the base address indicating a location of the accessed data within the memory segment.

19. The computer readable storage medium of claim 11, further comprising:
detecting, by a floating point segment selector update device, a floating point segment update selector flag;
once detected, reading by the floating point segment selector update unit, floating point data segment selector information from a floating point data segment selector update register; and
once read, storing the floating point data segment selector information within a corresponding portion of a segment register file.

20. The computer readable storage medium of clam 12, further comprising:
detecting, by a floating point selector update device, a write to a floating point segment selector control register;
once detected, reading floating point data segment selector information from the floating point selector control register; and
storing the floating point data segment selector information within a corresponding portion of a register file.

21. A system comprising:
a processor including micro-code to implement a micro-code event handler;
a floating point segment selector update device coupled to the processor via a bus to update floating point segment selector information associated with detected micro-operations of memory referencing macro-instructions;
a retirement unit, coupled to the processor via the bus, to detect, during a system clock cycle retirement window, a micro-operation decoded from a memory referencing macro-instruction, the detected micro-operation having a floating point data segment selector update modifier,
wherein when the detected micro-operation triggers an event, the retirement unit triggers the micro-code event handler to initiate an update of floating point segment selector information associated with the detected micro-operation, and otherwise, triggers the floating point update device to update the floating point segment selector information associated with the detected micro-operation.

22. The system of claim 21,
wherein the retirement unit determines, according to an event triggered by the detected micro-operation, a physical data segment containing the data accessed by the memory referencing macro-instruction, and writes the physical segment into an event control register to trigger the micro-code event handler.

23. The system of claim 21,
wherein the retirement unit further asserts a floating point segment selector update flag, reads a physical segment containing floating point segment selector information of the detected micro-operation, and transmits the physical segment to the floating point segment selector update device.

24. The system of claim 21,
wherein the floating selector update device reads, according to a detected floating point update flag, floating point segment selector information from a floating point segment selector update register, and stores the floating point segment selector information within a corresponding portion of a register file.

25. The system of claim 21,
wherein the floating selector update device reads, according to a write detected to a floating point segment selector control register, floating point segment selector information from the floating point segment selector control register, and stores the floating point segment selector information within a corresponding portion of a register file.

\* \* \* \* \*